July 23, 1940.  J. H. BOWER ET AL  2,209,185
BATTERY UNIT
Filed April 22, 1939
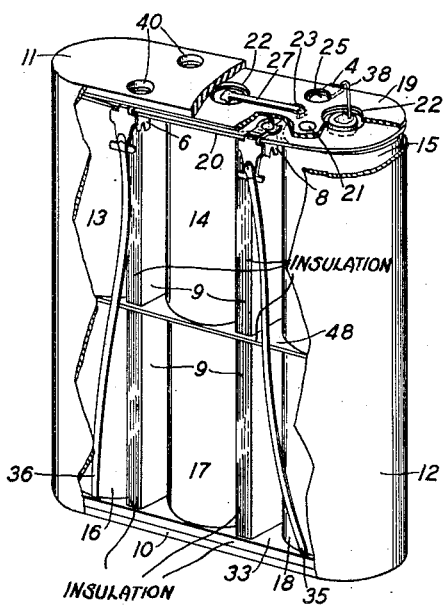
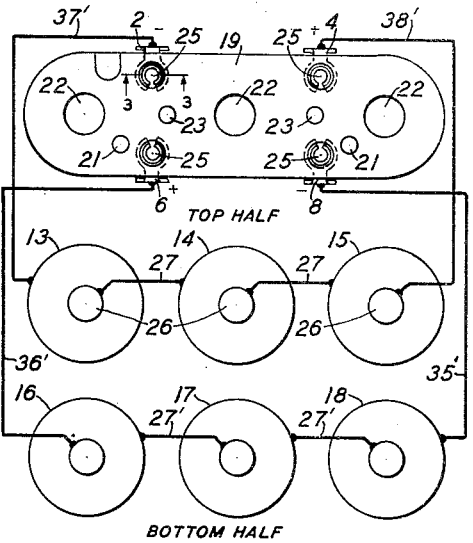
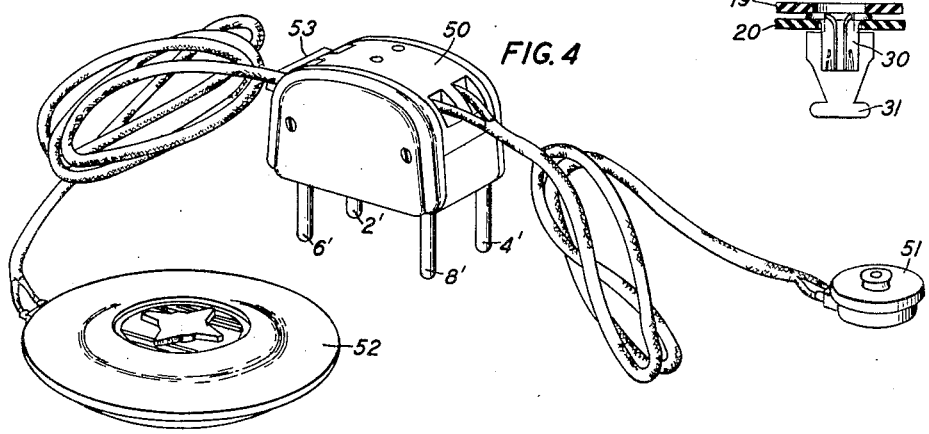
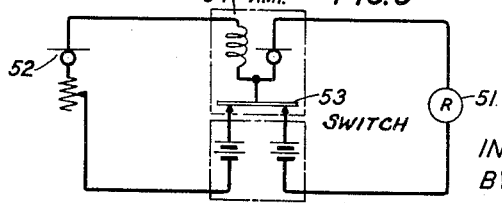
INVENTORS: J. H. BOWER
J. C. WRIGHT
BY
ATTORNEY Patented July 23, 1940

2,209,185

UNITED STATES PATENT OFFICE 2,209,185

BATTERY UNIT

Justus H. Bower, Rutherford, and James C. Wright, Millburn, N. J., assignors to Bell Telephone Laboratories, Incorporated, New York, N. Y., a corporation of New York Application April 22, 1939, Serial No. 269,514

7 Claims. (Cl. 136—108)

This invention relates to battery units and particularly to a dry cell battery unit which is suitable for use with hearing aids of the type comprising a pick-up microphone, an amplifier and a head receiver and in which the receiver and amplifier are included in one circuit and the microphone and amplifier in another circuit, each of said circuits being furnished with power from a separate source.

It is the object of this invention to provide a simple, compact and improved battery unit of the pocket type which is particularly suitable for use with hearing aids of the above-described type.

This object is attained in accordance with a feature of the invention by housing in a single container a double set of dry cells, each set constituting a separate battery for supplying power for the receiver and transmitter circuits of a hearing aid.

Another feature of the invention resides in terminating the double set of battery terminals in socket terminals on a terminal-holding strip and arranging the socket terminals in such a manner that the correct polarities are applied to the receiver and transmitter circuits irrespective of how the audiphone plug is associated with the battery unit.

These and other features of the invention will be readily understood from the following detailed description made with reference to the accompanying drawing, in which:

Fig. 1 is a perspective view of a battery unit of this invention, with a portion of the casing or jacket broken away to disclose the interior construction of the unit, the relative locations of the dry cells which constitute the two independent batteries and the leads which interconnect the terminals of the batteries with their respective socket terminals on the terminal-holding strip;

Fig. 2 is a schematic illustration of the double battery unit showing the intercell connections and the conections between each battery and its respective set of socket terminals on the terminal-holding strip;

Fig. 3 is an enlarged section taken along the line 3—3 of Fig. 2, looking in the direction of the arrows and illustrates the socket or jack-type terminals of the terminal-holding strip;

Fig. 4 is a view of a hearing aid set, showing, in perspective, the four-fingered plug which functions with the battery unit of Fig. 1, and also the transmitter and receiver units which constitute essential elements of the set; and Fig. 5 is a circuit diagram of the set shown in Fig. 4 and illustrates the battery connections thereto.

Referring particularly to Fig. 1 and Fig. 2, the housing of the battery unit is essentially a container consisting of a double cardboard bottom 10, a cardboard top 11 and a jacket or wrapper 12 of similar material which is slipped over the peripheries of the top and bottom pieces to effect a completely enclosed area. When the top, bottom and jacket are assembled, they may be held together as an integral unit by covering them with a covering of paper or other suitable material and securing the covering thereto by means of a suitable adhesive. The paper covering may be made to simulate leather or some other suitable finish. If desirable, the jacket sides may be turned over the end pieces and cemented thereto.

Housed within the container are two sets of three dry cells, the upper set consisting of cells 13, 14 and 15 and the lower set comprising cells 16, 17 and 18. The two sets of cells have their lower ends or bottoms facing each other so that the terminal ends of the upper set of cells 13, 14 and 15 face the upper end of the unit and the terminal ends of the lower set of cells 15, 16 and 17 face the lower end or bottom of the unit. Interposed between the bottom ends of the two sets of cells is a stiff insulator or separator 48 which divides the interior of the container transversely into two substantially similar compartments.

Intermediate the top piece 11 and the terminal ends of the upper set of cells 13, 14 and 15 is positioned a terminal-holding strip consisting of two similarly formed insulating sheets 19 and 20. These two sheets are secured together by two rivets 21, which, while effecting a substantially unitary structure, permit the sheets to be partially separated. The upper element 19 is provided with three relatively large circular apertures 22 and two smaller apertures 23. The large apertures 22 are spaced evenly as shown in Fig. 2, with a smaller aperture 23 interposed between the center aperture 22 and each of the outer large apertures. As clearly seen in Fig. 2, the element, or plate 19, is also provided with four other apertures 25 which are located at the corners of a rectangle. The lower terminal-holding strip member 20 is identical to the upper plate 19 just described, so that the apertures 22, 23 and 25 of the two plates are in alignment.

When the terminal-holding strip is in position, the positive terminals 26 of the cells 13, 14 and 15 protrude through the apertures 22 of the members 19 and 20. The positive and negative terminals of cells 13, 14 and 15 are each interconnected by means of a ribbon conductor such as 27 shown in Fig. 1, one end of the ribbon being soldered to the positive cell terminal or post protruding through aperture 22 and the other end passing through the aligned apertures 23 of members 19 and 20 and soldered to the negative terminal of the cell.

In each of the four rectangularly disposed apertures 25 of the lower element 20 of the terminal-holding strip is recessed a socket, or jack-type terminal 2, 4, 6 or 8. The jack-type terminal consists of a female contact portion which extends downwardly from the member 20, a link-like portion which extends at right-angles from the upper end of the female portion outwardly to the edge of the plate 20 and a terminal tab portion which extends downwardly at right-angles from the link-like portion. The terminal tab is identified in Fig. 3 by the numeral 31. The link-like portion or that portion which interconnects the female contact portion and the tab 31 is therefore confined between the two juxtaposed surfaces of the terminal-holding strip members 19 and 20, the upper end of the female portion being circularly flared or flanged to maintain the contact element in position.

Interposed between the double cardboard bottom 10 of the container is an insulator 33 which is identical in shape to the terminal-holding strip elements 19 and 20 and is provided with apertures similar to the apertures 22 and 23 of those elements and which serve the same purpose, that is to permit the central or positive posts of the cells to extend through the larger apertures and to allow intercell connections to be made. The intercell connections are made by metal ribbon conductors similar to the conductors 27 and in Fig. 2 are identified by the numeral 27'.

The cells of each battery are separated by cardboard spacers 9 which serve to hold the cells securely in position and prevent lateral shifting or movement thereof.

Viewing Fig. 1 and Fig. 2, the negative terminal of cell 18 which constitutes the negative terminal of the lower battery is connected to the forward right terminal 8 of the terminal strip by means of the ribbon conductor 35, whereas the positive terminal of cell 16 which constitutes the positive terminal of the lower battery is connected to the forward left terminal 6 of the terminal strip by means of the ribbon conductor 36. These leads are designated 35' and 36, respectively in Fig. 2.

The negative terminal of cell 13 is connected by a wire conductor (not seen in Fig. 1) to the rear left terminal 2 of the terminal-holding strip while the positive terminal of cell 15 is connected to the rear right terminal 4 of the terminal-holding strip by the wire conductor 38 as seen in Fig. 1. These leads are designated 37' and 38' in Fig. 2.

It will be observed that the two socket terminals of each set of cells, or battery, are situated on the same side of the terminal strip but that terminals of like polarity are diagonally disposed on the strip. This arrangement of terminals insures the correct polarities being at all times connected to the transmitter and receiver elements of the hearing aid regardless of how the connector 50 may be plugged into the terminal-holding strip. This will be explained more fully hereinafter.

The top piece 11 of the container is provided with four apertures 40 (only two of which are seen in Fig. 1) which correspond to the terminal-holding strip apertures 25 and are in alignment therewith.

As illustrated in Fig. 4, the hearing aid with which the battery unit functions comprises a receiver 51, a transmitter 52 and the four-fingered plug 50. The plug 50 houses the amplifier indicated by the numeral 54 in Fig. 5 and is provided with a switch 53 which, when actuated, conditions the audiphone for use. These particular elements may be of any suitable design and do not constitute a part of the present invention. The amplifier, its casing and switch may be of the form disclosed in a copending application filed June 30, 1938 and bearing Serial No. 216,692.

When in use, the battery unit may be carried in a pocket of the user's clothing or may be otherwise concealed on his or her person with the plug fingers 2', 4', 6' and 8' plugged into the socket or jack-type contacts 2, 4, 6 and 8, respectively, of the battery terminal-holding strip. The plug contacts are so arranged that the fingers 2' and 4' terminate one of the audiphone circuits, the receiver circuit, for example, whereas the fingers 6' and 8' terminate the other, or transmitter circuit. When the plug 50 is associated with the battery unit in the manner just described it will be noted, by referring particularly to Fig. 2, that the receiver circuit will be supplied with current from the battery comprising cells 13, 14 and 15 while the transmitter circuit will be connected to the battery consisting of cells 16, 17 and 18. It will also be noted that under this condition the plug fingers 2' and 8' are connected to negative battery terminals by way of socket terminals 2 and 8 while the plug fingers 4' and 6' are connected to positive battery terminals by way of socket terminals 4 and 6. This arrangement insures the correct application of battery polarities to the respective hearing aid circuits.

It will be observed that the plug 50 may also be associated with battery unit in such a manner that the plug fingers 2', 4', 6' and 8' will be inserted in the battery unit socket terminals 8, 6, 4 and 2, respectively, in which case, the transmitter circuit, terminating in plug fingers 6' and 8', would be supplied by the battery comprising cells 13, 14 and 15, whereas the receiver circuit, terminating in plug fingers 2' and 4', would be associated with the battery consisting of cells 16, 17 and 18. Though the batteries have been interchanged with respect to the circuits supplied thereby, it will be noted that the plug fingers are connected to terminals of the same polarity as in the previous case. Thus, each plug finger will encounter the same battery polarity irrespective of how the plug 50 is associated with the terminals of the battery unit.

It is essential that the respective hearing aid circuits receive current in but one direction. It is apparent that the terminal arrangement of the battery unit of this invention meets this requirement without the necessity for employing sockets of different diameters and correspondingly dimensioned plug fingers, or for equipping the plug with a fifth finger and the terminal-holding strip with a dummy socket to accommodate the extra finger, in order to insure proper association of the plug with the battery. This battery construction also eliminates the need for an internal filler, such as sealing wax, which not only adds to the cost of the unit but also increases its weight.

The double battery arrangement, in its particular application to hearing aids, has several advantages over the single battery; for example, the circuits are free of feedback caused by the rising resistance of the battery due to age and use and it avoids adverse effects from contact resistance at connections to batteries, cords, etc.

The arrangement of the battery unit cells need not necessarily conform to the particular showing of Fig. 1. It will be understood that this showing has been chosen merely for illustrative purposes and the internal construction of the unit is capable of wide variations. Nor is it essential that the shape of the container be limited to that illustrated. It is obvious that the container may be given a curved shape, for example, to make it fit more comfortably to the user's person or to adapt it for carriage in certain pockets of the user's clothing.

What is claimed is:

1. In a power unit, a pair of batteries each having a positive terminal and a negative terminal, a container housing both said batteries, a terminal-holding strip for said batteries located in said container and having four socket terminals arranged in a rectangular formation and lead wires housed in said container and permanently connecting battery terminals of like polarities with diagonally disposed socket terminals of said terminal-holding strip.

2. In a power unit, a pair of batteries each having a positive terminal and a negative terminal, a container housing both said batteries, a terminal-holding strip for said batteries located in said container and having four socket terminals arranged in a rectangular formation, a lead wire for each of the positive terminals of said batteries extending to a particular terminal of one pair of diagonally disposed socket terminals of said terminal strip and a lead wire for each of the negative terminals of said batteries extending to a separate terminal of the other pair of diagonally disposed socket terminals of said terminal-holding strip.

3. In a power unit, a set of dry cells interconnected to effect a battery, a second set of dry cells interconnected to effect a second battery, each of the batteries so effected having a positive terminal and a negative terminal, a container housing said sets of dry cells, a terminal-holding strip for said container having four socket terminals arranged in a rectangular formation and lead wires housed in said container and permanently connecting battery terminals of like polarities with diagonally disposed socket terminals of said terminal-holding strip.

4. In a power unit, a container comprising a top piece, a bottom piece and a jacket encompassing said top and bottom pieces and forming therewith an enclosure, a separator dividing said enclosure transversely into two compartments, a battery comprising a plurality of serially connected dry cells located in one of the compartments, a second battery comprising a plurality of serially connected dry cells located in the other compartment, the non-terminal ends of the dry cells of each battery abutting opposite sides of said separator, a terminal-holding strip interposed between the container top piece and the terminal ends of said first battery, said strip carrying a pair of socket terminals for each of said batteries and said socket terminals being arranged in a rectangular formation, and leads extending from the terminals of said batteries to the socket terminals of said terminal-holding strip in such a manner as to maintain diagonally disposed socket terminals of said strip at the same polarity.

5. In a power unit, a container comprising a top piece, a bottom piece and a jacket encompassing said top and bottom pieces, a set of dry cells located within said container and having their terminal ends facing said bottom piece, a second set of dry cells located within said container and having their terminal ends facing said top piece, a terminal-holding strip interposed between said top piece and the terminal end of said second set of dry cells, means connecting the cells of each of said sets in series to effect two separate batteries carried by said terminal strip, said socket terminals being arranged on said strip in a rectangular formation, and leads permanently connecting battery terminals of like polarities with diagonally disposed socket terminals of said terminal-holding strip.

6. A power unit comprising a container, a pair of batteries housed within said container, each of said batteries comprising a plurality of serially connected dry cells longitudinally disposed within said container with the terminal ends of said cells facing opposite ends of said container, a terminal-holding strip supported on the terminal ends of one of said sets of cells and provided with apertures through which the terminal posts of said cells extend, a pair of socket terminals on said terminal-holding strip for each of said batteries, said socket terminals being arranged in a rectangular formation, wire connections between battery terminals of like polarities and diagonally disposed socket terminals and a top piece for said container having apertures in alignment with the socket terminals of said terminal-holding strip.

7. In combination with a plug terminal having two pairs of permanently fixed finger contacts, each of said pairs of finger contacts constituting the terminals of an external circuit, a battery, a second battery, a container housing said batteries and each of said batteries having a pair of terminals of opposite polarities, a terminal-holding strip housed within said container, a socket terminal for each of said battery terminals carried by said terminal-holding strip, said socket terminals being arranged in a rectangular formation, and connections permanently electrically associating the battery terminals of like polarities with diagonally disposed socket terminals of said terminal-holding strip, whereby said plug terminal may be associated with said terminal-holding strip in either of two manners without reversing the battery polarities connected to each of the pairs of finger contacts of said terminal.

JUSTUS H. BOWER.
JAMES C. WRIGHT.